US010914911B2

(12) United States Patent
Takeshita et al.

(10) Patent No.: US 10,914,911 B2
(45) Date of Patent: Feb. 9, 2021

(54) LENS BARREL AND IMAGING DEVICE

(71) Applicant: FUJIFILM Corporation, Tokyo (JP)

(72) Inventors: Yukitaka Takeshita, Saitama (JP); Mitsuhiko Oka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 365 days.

(21) Appl. No.: 15/920,670

(22) Filed: Mar. 14, 2018

(65) Prior Publication Data

US 2018/0203202 A1 Jul. 19, 2018

Related U.S. Application Data

(63) Continuation of application No. PCT/JP2016/077002, filed on Sep. 13, 2016.

(30) Foreign Application Priority Data

Sep. 15, 2015 (JP) ................................ 2015-181841

(51) Int. Cl.
*G02B 7/02* (2006.01)
*G03B 17/14* (2006.01)
(Continued)

(52) U.S. Cl.
CPC .............. *G02B 7/02* (2013.01); *G02B 7/021* (2013.01); *G02B 7/04* (2013.01); *G02B 7/08* (2013.01);
(Continued)

(58) Field of Classification Search
CPC ...... G01D 5/249; G01D 5/2497; H03M 1/285
See application file for complete search history.

(56) References Cited

U.S. PATENT DOCUMENTS 5,291,232 A * 3/1994 Kobayashi ............ G02B 7/102 396/87
5,298,698 A * 3/1994 Iida ......................... G01D 5/02 200/11 DA
(Continued)

FOREIGN PATENT DOCUMENTS

JP 5-11163 A 1/1993
JP 7-110521 A 4/1995
(Continued)

OTHER PUBLICATIONS

Chinese Office Action and Search Report dated Nov. 22, 2019, for corresponding Chinese Patent Application No. 201680053534.8, with partial English translation.
(Continued)

*Primary Examiner* — Clayton E. LaBalle
*Assistant Examiner* — Leon W Rhodes, Jr.
(74) *Attorney, Agent, or Firm* — Birch, Stewart, Kolasch & Birch, LLP

(57) ABSTRACT

A lens barrel includes a lens barrel body, an imaging optical system, a focus ring, a diaphragm operation ring, and a sensor. The sensor includes a code board and first and second contact brushes. The code board is provided on the inner peripheral side of the diaphragm operation ring. The first and second contact brushes are provided on the outer peripheral side of the lens barrel body, and include a plurality of conductive contacts sliding on the code board in accordance with the rotation of the diaphragm operation ring. Signals are acquired from the conductive contacts of the first and second contact brushes and the rotational position of the diaphragm operation ring is detected.

8 Claims, 9 Drawing Sheets

24 26 34 35 36 57a 57 57b 59 58D 58C 58A 58B 61 60D 60C 60A 60B 62 CD A

(51) Int. Cl.

| | |
|---|---|
| ***G03B 7/00*** | (2021.01) |
| ***G02B 7/08*** | (2021.01) |
| ***G02B 7/04*** | (2021.01) |
| ***G03B 17/18*** | (2021.01) |
| *G02B 7/09* | (2021.01) |

(52) U.S. Cl.

CPC ............... *G03B 7/00* (2013.01); *G03B 17/18* (2013.01); *G02B 7/09* (2013.01); *G03B 17/14* (2013.01)

(56) References Cited

U.S. PATENT DOCUMENTS

| | | | | |
|---|---|---|---|---|
| 8,253,413 | B2 * | 8/2012 | Hammerschmidt . | G01R 33/095 324/207.25 |
| 2004/0169434 | A1 * | 9/2004 | Washington ........... | H01R 39/24 310/232 |
| 2012/0327274 | A1 | 12/2012 | Taguchi et al. | |
| 2015/0234147 | A1 | 8/2015 | Nagano | |

FOREIGN PATENT DOCUMENTS

| | | | |
|---|---|---|---|
| JP | 07110521 | A * | 4/1995 |
| JP | 8-82838 | A | 3/1996 |
| JP | 8-304115 | A | 11/1996 |
| JP | 11-287939 | A | 10/1999 |
| JP | 2002-156574 | A | 5/2002 |
| JP | 2006-234879 | A | 9/2006 |
| JP | 2010-72582 | A | 4/2010 |
| JP | 2013-7837 | A | 1/2013 |
| JP | 2014-6406 | A | 1/2014 |
| JP | 2015-1717 | A | 1/2015 |
| JP | 2015-25897 | A | 2/2015 |
| JP | 2015-152893 | A | 8/2015 |

OTHER PUBLICATIONS

Japanese Office Action, dated Mar. 12, 2019, for corresponding Japanese Application No. 2017-539919, with an English translation.

International Preliminary Report on Patentability and Written Opinion of the International Searching Authority (Forms PCT/IPEA/409 and PCT/ISA/237) for International Application No. PCT/JP2016/077002, dated Jan. 16, 2018, with English translations.

International Search Report (Forms PCT/ISA/210) for International Application No. PCT/JP2016/077002, dated Dec. 6, 2016, with English translation.

Japanese Office Action dated Oct. 1, 2019 for corresponding Japanese Patent Application No. 2017-539919, with English translation.

* cited by examiner 11
12
14
RELEASE SWITCH
48
AE PROCESSING UNIT
43
IMAGE DISPLAY UNIT
42
LCD DRIVER
44
CARD I/F
46
MEMORY CARD
45
37
BODY CONTROL UNIT
41
IMAGE DATA PROCESSING UNIT
40
IMAGE MEMORY
39
MOTOR DRIVER
20
SOLID-STATE IMAGING ELEMENT
38
SHUTTER UNIT
47
M
17
27
19
28
29
LENS CONTROL UNIT
30
MOTOR DRIVER
32
31
M
33a
33
22a
22
26
24
25
23
L 51
62
56
35
57
57b
57a
36
26
55
24a
34
53
24
54
23
21
22
12

| THE NUMBER OF STAGES | DIAPHRAGM VALUE (AV VALUE) | SIGNAL FROM FIRST CONTACT BRUSH | SIGNAL FROM SECOND CONTACT BRUSH |
|---|---|---|---|
| 1 | (AE POSITION) | 000 | 111 |
| 2 | (AE POSITION) | 000 | 110 |
| 3 | (AE POSITION) | 001 | 110 |
| 4 | 8 | 001 | 100 |
| 5 | 23/3 | 011 | 100 |
| 6 | 22/3 | 011 | 000 |
| 7 | 7 | 111 | 000 |
| 8 | 20/3 | 111 | 010 |
| 9 | 19/3 | 110 | 010 |
| 10 | 6 | 110 | 011 |
| 11 | 17/3 | 100 | 011 |
| 12 | 16/3 | 100 | 001 |
| 13 | 5 | 000 | 001 |
| 14 | 14/3 | 000 | 101 |
| 15 | 13/3 | 010 | 101 |
| 16 | 4 | 010 | 111 |
| 17 | 11/3 | 011 | 111 |
| 18 | 10/3 | 011 | 011 |
| 19 | 3 | 001 | 011 |
| 20 | 8/3 | 001 | 010 |
| 21 | 7/3 | 101 | 010 |
| 22 | 2 | 101 | 000 |

LENS BARREL AND IMAGING DEVICE

CROSS-REFERENCE TO RELATED APPLICATIONS

This application is a Continuation of PCT International Application No. PCT/JP2016/077002 filed on 13 Sep. 2016, which claims priority under 35 U.S.C § 119(a) to Japanese Patent Application No. 2015-181841 filed on 15 Sep. 2015. The above application is hereby expressly incorporated by reference, in its entirety, into the present application.

BACKGROUND OF THE INVENTION

1. Field of the Invention

The present invention relates to a lens barrel and an imaging device having a manual adjustment function to adjust a diaphragm and a focus.

2. Description of the Related Art

A camera, such as a single-lens reflex camera for an expert, has a manual adjustment function that allows a user to manually adjust a diaphragm and a focus. In the camera having the manual adjustment function, for example, an operation ring to be operated by a user is provided and the diaphragm and a focal distance can be selected according to the rotational position of the operation ring.

Each of JP2006-234879A and JP2013-7837A (corresponding to US2012/327274A1) discloses a camera in which a position detection device is built. The position detection device includes a code board on which a pattern is formed by a combination of a conductive portion and a non-conductive portion, and brush members that include a plurality of conductive contacts sliding on the code board in accordance with the rotation of an operation ring. The position detection device detects the rotational position of the operation ring by a signal output from the code board in a case in which the conductive contacts are in contact with either the conductive portion or the non-conductive portion.

In the position detection device disclosed in JP2006-234879A, the code board is mounted on a lens barrel that is disposed parallel to a plane orthogonal to the axial direction of the lens barrel, and the brush members are mounted on the operation ring. On the other hand, in the position detection device disclosed in JP2013-7837A, the code board is disposed on the outer peripheral side of a lens barrel body and the brush members are disposed on the inner peripheral side of the operation ring.

To more finely set a diaphragm value and a focal distance, it is desired to improve the detection accuracy of the rotational position of the operation ring. Accordingly, the position detection device disclosed in JP2006-234879A is adapted so that the pattern of the code board is divided into two patterns in the circumferential direction and the respective divided patterns are made to slide on the different conductive contacts to obtain signals. As a result, the detection accuracy of a rotational position is improved.

SUMMARY OF THE INVENTION

Since the code board is provided in parallel to a plane orthogonal to the optical axis of an imaging optical system in the camera including the position detection device disclosed in JP2006-234879A, a space is required in the axial direction of a lens barrel. For this reason, a reduction in the size of the camera is hindered. Since the pattern of the code board is divided into two patterns in the camera disclosed in JP2006-234879A, the dimension of the lens barrel in the radial direction can be reduced but the dimension of the lens barrel in the axial direction cannot be reduced.

Further, since the code board is disposed on the outer peripheral side of the lens barrel body and the brush members are disposed on the inner peripheral side of the operation ring in the camera disclosed in JP2013-7837A, a space in which the brush members are moved in the radial direction and the circumferential direction of the lens barrel is required. Since various components and fixing members (for example, screws) for fixing a mounting part are provided inside the lens barrel, it is difficult to receive the brush members, which require a space for movement in the circumferential direction, in the lens barrel. Accordingly, there is a problem that a reduction in the size of such a camera in the radial direction of the lens barrel is hindered.

An object of the invention is to provide a lens barrel and an imaging device of which the size can be reduced in a radial direction and an axial direction.

A lens barrel of the invention includes a lens barrel body, an operation ring, a code board, brush members, and a rotational position-detection unit. The operation ring is rotatably mounted on the lens barrel body. The code board is provided on an inner peripheral side of the operation ring, and on which a pattern is formed on the code board by a combination of an electrically isolated conductive portion and a non-conductive portion. The brush members are provided on an outer peripheral side of the lens barrel body and include a plurality of conductive contacts sliding on the code board in accordance with a rotation of the operation ring. The rotational position-detection unit acquires signals from the conductive contacts and detects a rotational position of the operation ring.

It is preferable that the plurality of conductive contacts are formed of a reference contact to which a first potential is applied and which is always in contact with the conductive portion, and a plurality of signal contacts which are in contact with either the conductive portion or the non-conductive portion, output the first potential as the signals by being electrically connected to the reference contact through the conductive portion in a case in which the signal contacts are in contact with the conductive portion, and output a second potential different from the first potential as the signals in a case in which the signal contacts are in contact with the non-conductive portion.

It is preferable that the pattern has a shape where a change in a potential of the signal contact, which is accompanied with a rotation of the operation ring, is generated on only one of the signal contacts at a time.

It is preferable that the brush members are formed of first and second contact brushes that are provided at positions different from each other in a circumferential direction of the operation ring. Further, it is preferable that each of the first and second contact brushes includes one reference contact and N signal contacts, the rotational position-detection unit acquires signals of 2N bits from the signal contacts of the first and second contact brushes and detects the position of the operation ring, and the pattern has a shape where the signals of 2N bits are changed at an interval of one bit in accordance with the rotation of the operation ring.

It is preferable that the second contact brush is disposed at a position away from the first contact brush by predetermined odd-numbered stages of the pattern. Further, it is preferable that the first potential is a ground potential and the second potential is a positive potential.

It is preferable that the lens barrel body includes a diaphragm and a diaphragm control unit controlling a diaphragm value of the diaphragm and the operation ring is a diaphragm operation ring allowing the diaphragm value to be selectively settable from a plurality of values.

It is preferable that the pattern includes at least the number of stages corresponding to a settable numerical value of the diaphragm value. It is preferable that a distal end portion, which is in contact with the code board, of each conductive contact is branched into two or more parts.

An imaging device of the invention includes the lens barrel.

According to the invention, it is possible to provide a lens barrel and an imaging device of which the size can be reduced in a radial direction and an axial direction.

BRIEF DESCRIPTION OF THE DRAWINGS

FIG. 9 is a diagram illustrating detection signals that are acquired from the first and second contact brushes.

DESCRIPTION OF THE PREFERRED EMBODIMENTS

Figure 1:
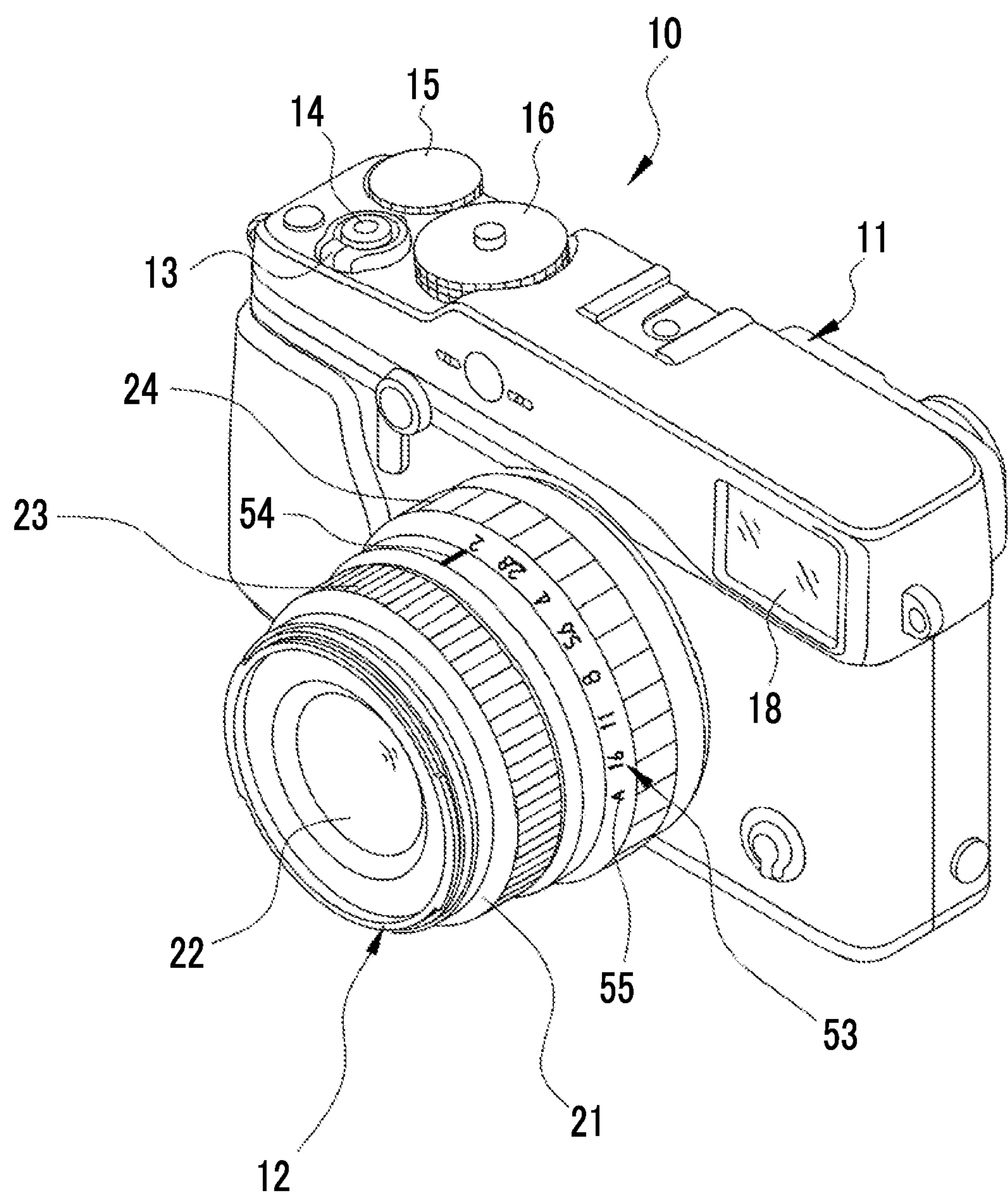
FIG. 1 is a perspective view showing the front appearance of a lens-interchangeable digital camera.
Figure 2:
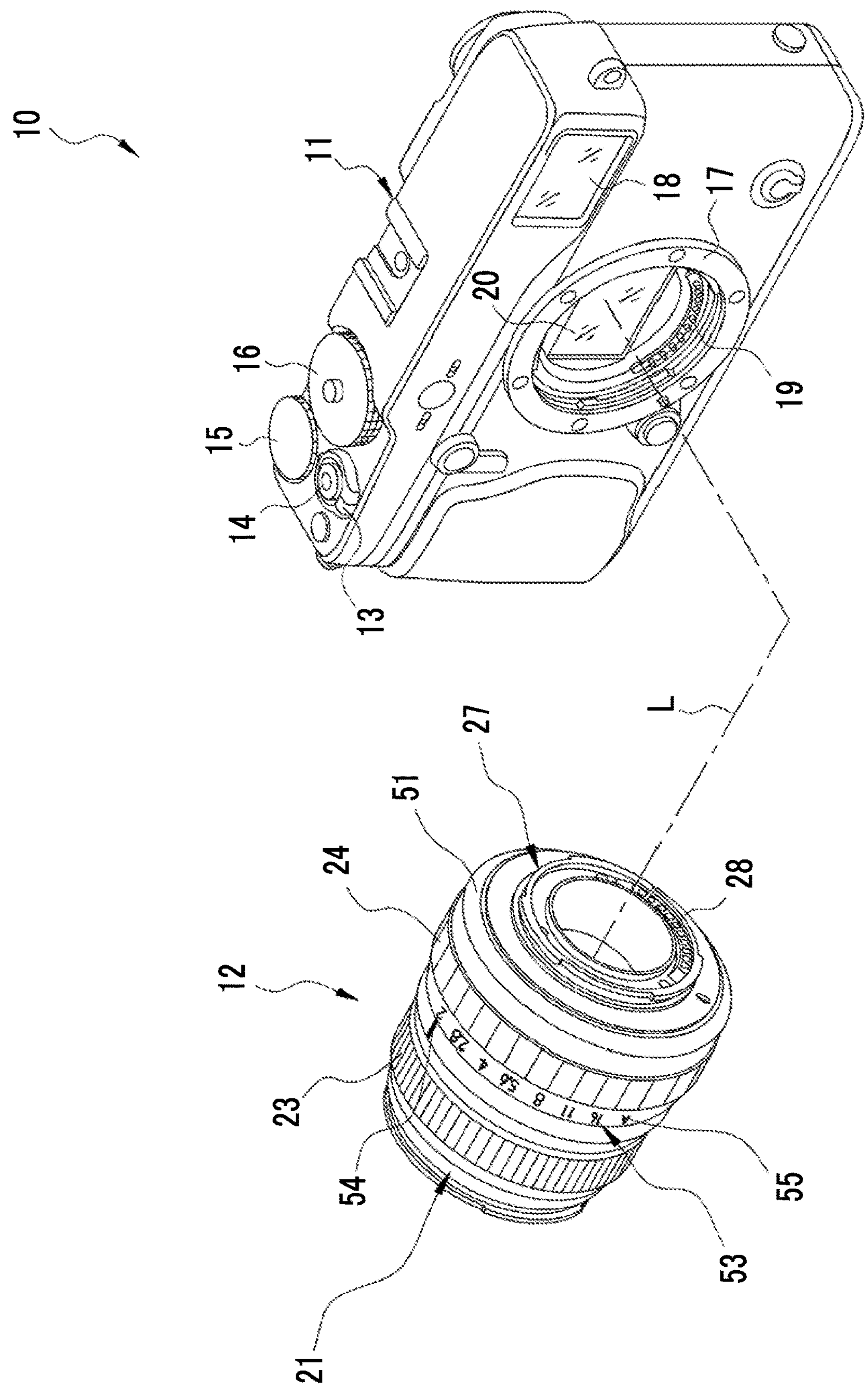
FIG. 2 is a perspective view showing the appearance of a lens barrel and a camera body.

In FIGS. 1 and 2, a lens-interchangeable digital camera (hereinafter, referred to as a camera) 10 includes a camera body 11 and a lens barrel 12. The lens barrel 12 is detachably connected to the camera body 11. The camera 10 is a mirrorless single-lens digital camera.

The camera body 11 includes a power lever 13, a release switch 14, an exposure correction dial 15, a shutter speed dial 16, and the like on the upper surface thereof. The release switch 14 is a two-stage stroke type switch that allows so-called "half press" and "full press". The release switch 14 outputs an S1-ON signal in a case in which the release switch is half pressed, and outputs an S2-ON signal in a case in which a full press where the release switch is further pressed from the half press is performed. In a case in which an S1-ON signal is output from the release switch 14, the camera 10 performs imaging preparation processing, such as automatic focusing (AF (Auto Focus) processing) or automatic exposure control. In a case in which an S2-ON signal is output from the release switch 14, the camera 10 performs imaging processing.

A mount 17 on which the lens barrel 12 is to be mounted and an optical finder window 18 are provided on the front surface of the camera body 11. A body-side signal contact 19, which is to be electrically connected to the lens barrel 12, and a solid-state imaging element 20 are provided in the mount 17. Further, an image display unit 43 (see FIG. 4), operation buttons, and the like are provided on the back surface of the camera body 11.

Figure 3:
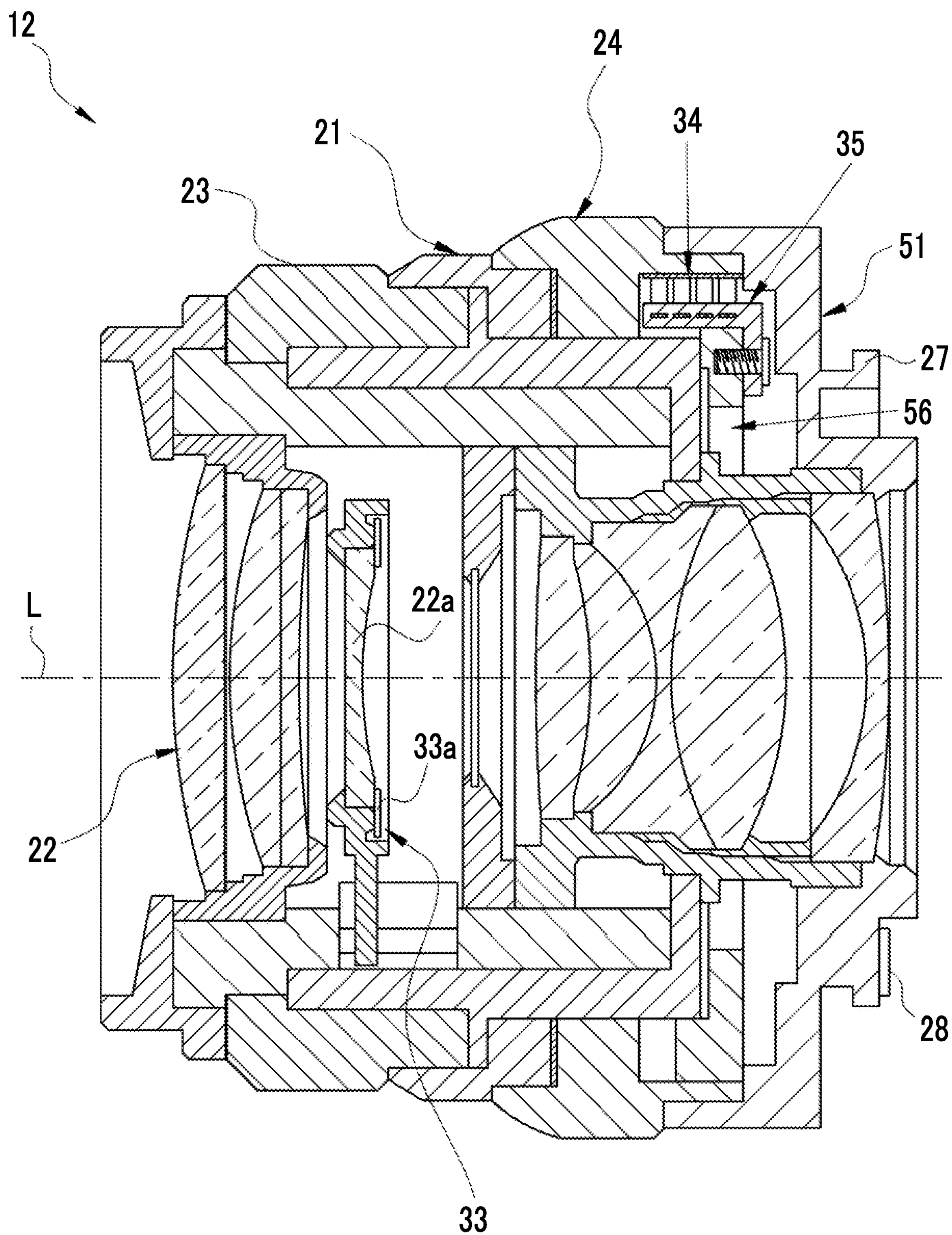
FIG. 3 is a cross-sectional view of main portions of the lens barrel taken along an optical axis.

As shown in FIG. 3, the lens barrel 12 includes a lens barrel body 21, an imaging optical system 22, a focus ring 23, a diaphragm operation ring 24, sensors 25 and 26 (see FIG. 4), a lens mount 27, a lens-side signal contact 28, and the like. The lens barrel body 21 has a cylindrical shape, and receives the imaging optical system 22 therein. The lens mount 27 is provided at the rear end of the lens barrel body 21. In a case in which the lens barrel 12 is connected to the camera body 11, the imaging optical system 22 forms an image on the solid-state imaging element 20 with subject light. The solid-state imaging element 20 is an imaging unit that takes an image with light emitted from the lens barrel 12.

The lens mount 27 is detachably coupled to the mount 17 of the camera body 11. In a case in which the lens mount 27 of the lens barrel 12 is coupled to the mount of the camera body 11, the lens-side signal contact 28 is in contact with the body-side signal contact 19 and electrically connects the lens barrel 12 to the camera body 11.

Figure 4:
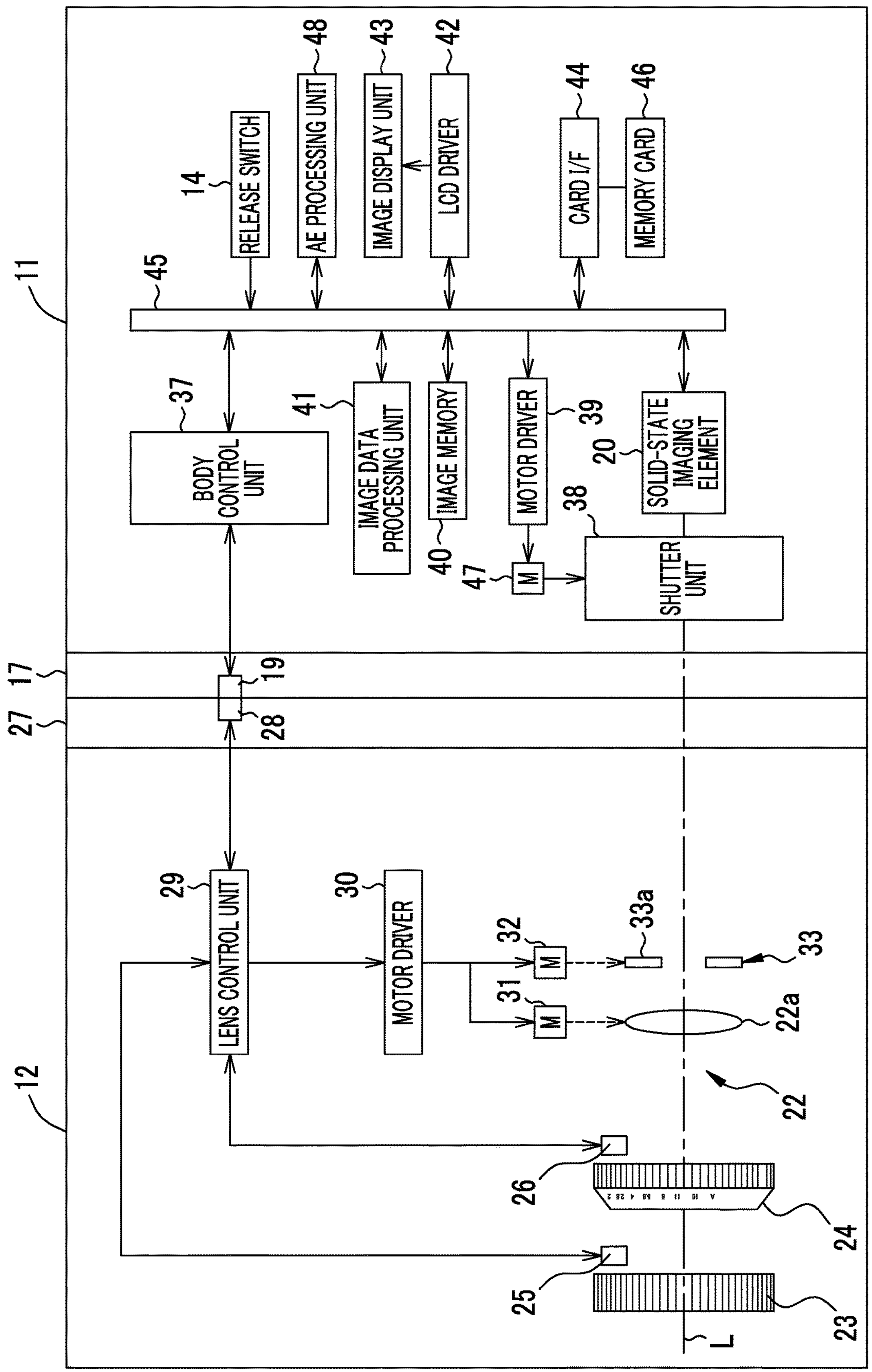
FIG. 4 is a block diagram showing the configuration of the lens-interchangeable digital camera.

As shown in FIG. 4, the lens barrel 12 includes a lens control unit 29, a motor driver 30, motors 31 and 32, and the like in addition to the imaging optical system 22, the focus ring 23, the diaphragm operation ring 24, the sensors 25 and 26, and the like.

The lens control unit 29 is formed of a microcomputer that includes a central processing unit (CPU), a read only memory (ROM) storing programs and parameters to be used in the CPU, a random access memory (RAM) used as a work memory of the CPU (all of them are not shown), and the like, and controls the respective parts of the lens barrel 12. The sensors 25 and 26 and the motor driver 30 are connected to the lens control unit 29.

The lens control unit 29 functions as a diaphragm control unit that controls the diaphragm value of a diaphragm unit 33 on the basis of a control signal output from a body control unit 37 to be described later and a rotational position-detection unit that acquires a signal from the sensor 26 and detects the rotational position of the diaphragm operation ring 24.

The imaging optical system 22 includes a plurality of lenses including a focus lens 22*a*, the diaphragm unit 33, and the like. The focus lens 22*a* is moved in the direction of an optical axis L by the driving of the motor 31 and adjusts an imaging distance. The diaphragm unit 33 moves a plurality of diaphragm blades 33*a* by the driving of the motor 32 to change the amount of light to be incident on the solid-state imaging element 20. The motor driver 30 controls the driving of the motors 31 and 32 on the basis of the control of the lens control unit 29.

The focus ring 23 is an operation member that is manually rotated by a user to adjust a focus. The focus ring 23 is mounted on the lens barrel body 21 so as to be rotatable about the optical axis L of the imaging optical system 22.

The sensor 25 detects the rotational direction and the rotation angle of the focus ring 23. The sensor 25 includes, for example, a comb-tooth ring (not shown) that is provided on the inner peripheral surface of the focus ring 23 and an optical sensor (not shown) that outputs a detection signal. The detection signal output from the sensor 25 is output to the lens control unit 29. The lens control unit 29 detects the rotational direction and the rotation angle of the focus ring 23 on the basis of the detection signal input from the sensor 25. Information on the rotational direction and the rotation angle of the focus ring 23, which are detected by the lens control unit 29, is output to the body control unit 37, which is provided in the camera body 11, through the lens-side signal contact 28 and the body-side signal contact 19.

The diaphragm operation ring 24 is an operation member that is manually rotated by a user to adjust a diaphragm. The diaphragm operation ring 24 is mounted on the lens barrel body 21 so as to be rotatable about the optical axis L of the imaging optical system 22.

Figure 5:
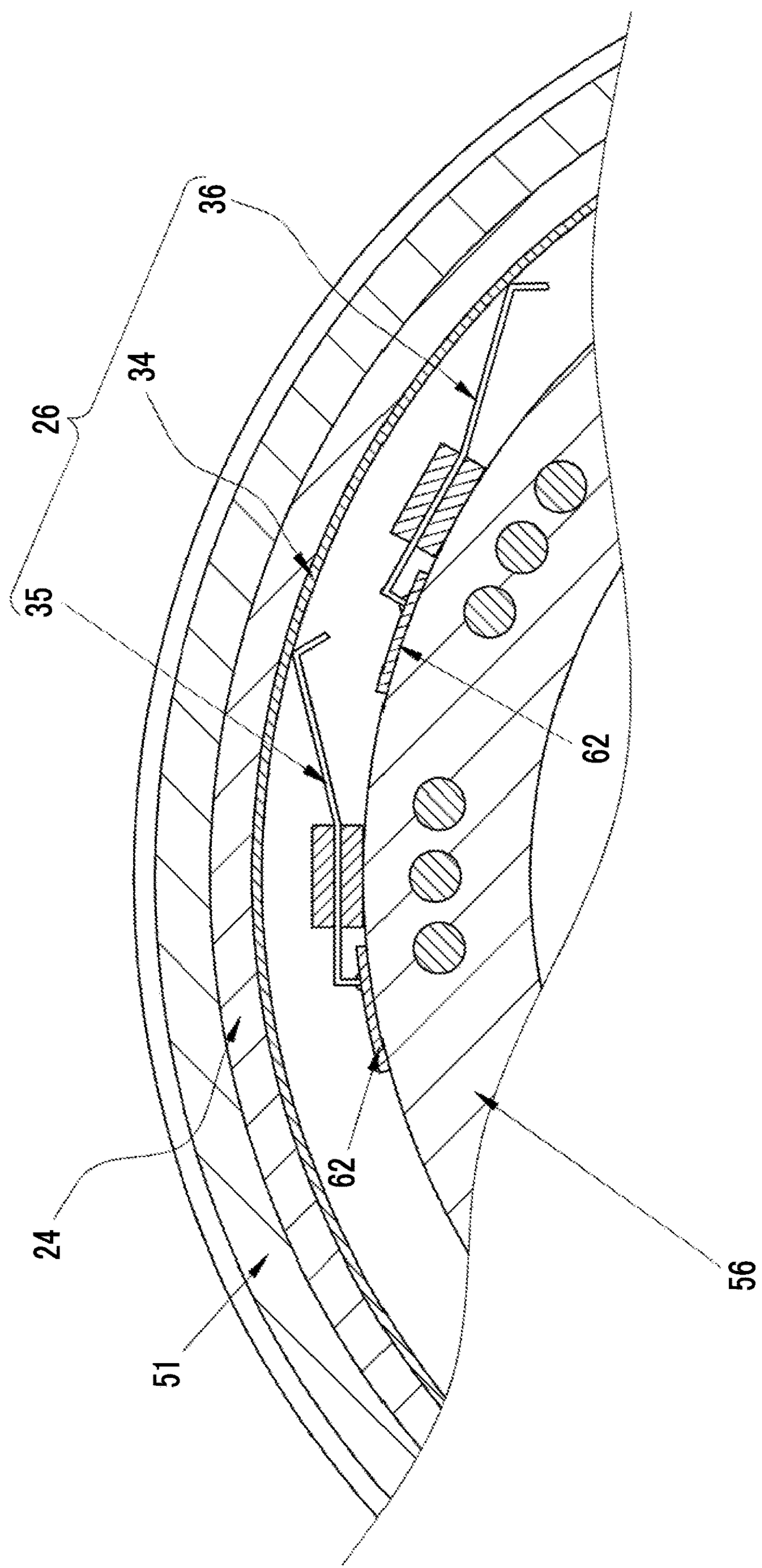
FIG. 5 is a cross-sectional view of main portions of the lens barrel near first and second contact brushes taken in a circumferential direction.

As shown in FIG. 5, the sensor 26 is a position sensor that includes a code board 34 and first and second contact brushes 35 and 36. A detection signal output from the sensor 26 is output to the lens control unit 29. The lens control unit 29 detects the rotational position of the diaphragm operation ring 24 on the basis of the detection signal input from the sensor 26. The rotational position of the diaphragm operation ring 24 corresponds to a diaphragm value. Further, as the rotational position of the diaphragm operation ring 24, there are a position, which is used to set an exposure mode to an automatic exposure mode, (hereinafter, referred to as an AE position) in addition to a position corresponding to a diaphragm value.

As described later, a pattern 57 (see FIGS. 7 and 8) is formed on the code board 34 so that a detection signal corresponding to the rotational position of the diaphragm operation ring 24 is detected from the first and second contact brushes 35 and 36. Information on the rotational position of the diaphragm operation ring 24, which is detected by the lens control unit 29, is output to the body control unit 37, which is provided in the camera body 11, through the lens-side signal contact 28 and the body-side signal contact 19.

The body control unit 37 includes a CPU, a ROM that stores programs and parameters to be used in the CPU, a RAM that is used as a work memory of the CPU (all of them are not shown), and the like. The body control unit 37 controls the camera body 11 and the respective parts of the lens barrel 12 that are connected to the camera body 11. An S1 signal and an S2 signal are input to the body control unit 37 from the release switch 14. Further, the body-side signal contact 19 is connected to the body control unit 37.

A shutter unit 38 is a so-called focal-plane shutter and is disposed between the mount 17 and the solid-state imaging element 20. The shutter unit 38 is provided so as to be capable of blocking an optical path between the imaging optical system 22 and the solid-state imaging element 20, and is changed between an open state and a closed state. The shutter unit 38 is in an open state in a case in which a live view image and a video are to be taken. The shutter unit 38 is temporarily changed to a closed state from an open state in a case in which a static image is to be taken. The shutter unit 38 is driven by a shutter motor 47. A motor driver 39 controls the driving of the shutter motor 47.

The driving of the solid-state imaging element 20 is controlled by the body control unit 37. For example, the solid-state imaging element 20 is a CMOS image sensor, and includes a light-receiving surface that is formed of a plurality of pixels (not shown) arranged in the form of a two-dimensional matrix. Each of the pixels includes a photoelectric conversion element, and generates an imaging signal by photoelectrically converting the image of a subject that is formed on the light-receiving surface by the lens barrel 12.

Further, the solid-state imaging element 20 includes signal processing circuits, such as a noise removal circuit, an automatic gain controller, and an A/D conversion circuit, (all of them are not shown). The noise removal circuit performs noise removal processing on an imaging signal. The automatic gain controller amplifies the level of an imaging signal to an optimum value. The A/D conversion circuit converts an imaging signal into a digital signal and outputs the digital signal to a busline 45 from the solid-state imaging element 20. An output signal of the solid-state imaging element 20 is image data (so-called RAW data) that has one color signal for each pixel.

An image memory 40 stores image data corresponding to one frame that is output to the busline 45. An image data processing unit 41 reads the image data, which corresponds to one frame, from the image memory 40, and performs publicly known image processing, such as a matrix operation, demosaicing, γ-correction, brightness/color difference conversion, and resizing.

An LCD driver 42 sequentially inputs the image data, which corresponds to one frame and has been subjected to image processing by the image data processing unit 41, to the image display unit 43. The image display unit 43 sequentially displays a live view image at a predetermined interval. A card I/F 44 is built in a card slot (not shown) provided in the camera body 11, and is electrically connected to a memory card 46 inserted into the card slot. The card I/F 44 stores the image data, which has been subjected to image processing by the image data processing unit 41, in the memory card 46. Further, in a case in which the image data stored in the memory card 46 is to be played back and displayed, the card I/F 44 reads the image data from the memory card 46.

The body control unit 37 performs a control, which allows the focus lens **22*a* to be moved according to the information on the rotational direction and the rotation angle of the focus ring 23 detected by the lens control unit 29, on the lens control unit 29. Specifically, the body control unit 37 sends a control signal, which allows the focus lens 22*a* to be moved according to the rotational direction and the rotation angle of the focus ring 23 detected by the sensor 25, to the lens control unit 29. The lens control unit 29 controls the motor driver 30 on the basis of the control signal and moves the focus lens 22*a***.

The body control unit 37 actuates the diaphragm unit 33 in accordance with information on the rotational position of the diaphragm operation ring 24 that is detected by the lens control unit 29, and sends a control signal, which changes the diaphragm diameter, to the lens control unit 29. The lens control unit 29 controls the motor driver 30 on the basis of the control signal, and changes the diaphragm diameter.

The diaphragm diameter of the diaphragm unit 33, which is to be changed according to the rotational position of the diaphragm operation ring 24, corresponds to diaphragm values of main series where an AV value is set to predetermined integer values and diaphragm values of subordinate series where an AV value is set to predetermined fraction values. In this embodiment, AV values to which the diaphragm values of the main series correspond are seven integer values of "2, 3, 4, 5, 6, 7, and 8".

The diaphragm values of the subordinate series are values where an AV value is set to n/3 (n is a positive integer except for multiples of 3) in the range of the main series. In the case of this embodiment, AV values corresponding to the diaphragm values of the subordinate series are twelve fraction values of "7/3, 8/3, 10/3, 11/3, 13/3, 14/3, 16/3, 17/3, 19/3, 20/3, 22/3, and 23/3".

Further, since an F-number satisfies a relationship of "$AV=2\log_2 F$" together with an AV value, the diaphragm values (F-numbers) of the main series correspond to "2, 2.8, 4, 5.6, 8, 11, and 16", respectively. The diaphragm values (F-numbers) of the subordinate series correspond to "2.2, 2.5, 3.2, 3.6, 4.5, 5, 6.4, 7.1, 9, 10, 13, and 14", respectively.

Since the diaphragm diameter of the diaphragm unit 33 is changed in the imaging optical system 22 of this embodiment as described above, the diaphragm diameter of the diaphragm unit 33 can be set to a total of nineteen diaphragm values of the main series and subordinate series (seven diaphragm values of the main series and twelve diaphragm values of the subordinate series).

The lens control unit 29 controls the motor driver 30 on the basis of the control signal, and controls the diaphragm diameter of the diaphragm unit 33 so that a diaphragm value corresponding to the rotational position of the diaphragm operation ring 24 is obtained. Furthermore, the body control unit 37 performs the automatic exposure mode in a case in which the rotational position of the diaphragm operation ring 24 detected by the lens control unit 29 is the AE position.

An AE processing unit 48 calculates an integrated value of the respective color signals from image data corresponding to one frame. In the case of the automatic exposure mode, the body control unit 37 calculates an exposure value on the basis of an integrated value calculated for each image corresponding to one frame and determines a shutter speed and a diaphragm value from this exposure value in accordance with a predetermined program diagram. Further, the body control unit 37 controls the driving of the shutter motor 47 so that the determined shutter speed is obtained, and sends a control signal to the lens control unit 29. The lens control unit 29 controls the motor driver 30 on the basis of the control signal, and actuates the diaphragm unit 33 to a diaphragm diameter where the determined diaphragm value is obtained.

Figure 6:
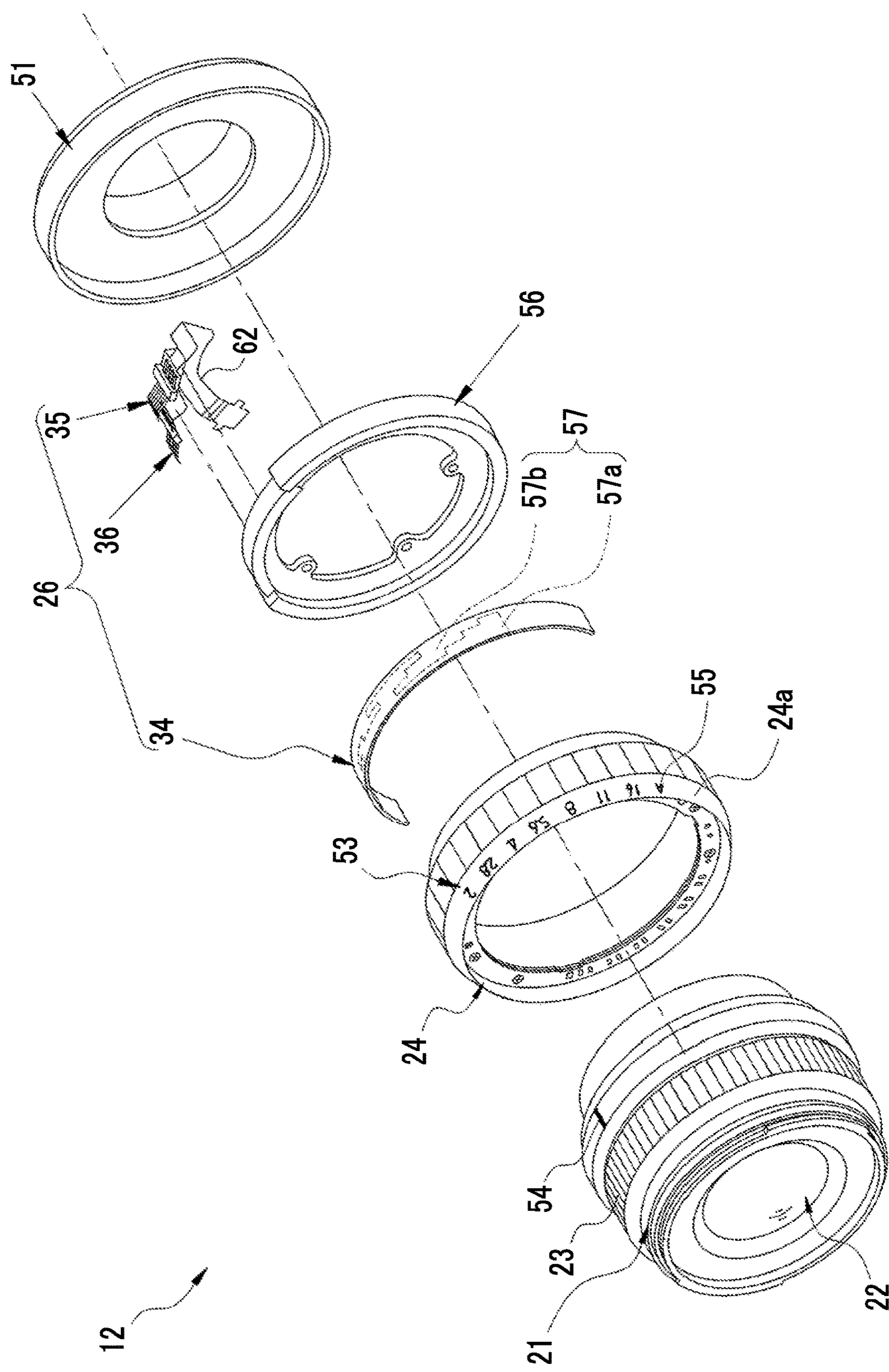
FIG. 6 is an exploded perspective view of a lens barrel body.

As shown in FIG. 6, the diaphragm operation ring 24 is rotatably mounted so as to be interposed between the lens barrel body 21 and the cover member 51. The lens mount 27 and the lens-side signal contact 28 (see FIGS. 2 and 3) are provided integrally with the cover member 51.

The diaphragm operation ring 24 has an annular shape, and includes a tapered surface 24A of which the outer diameter is reduced toward the distal end. Diaphragm value scales 53 representing the diaphragm values of the main series are provided on the tapered surface 24A. An indicator 54 is provided on the lens barrel body 21. The diaphragm value scales 53 are arranged along the circumferential direction of the diaphragm operation ring 24. Specifically, values of "2, 2.8, 4, 5.6, 8, 11, and 16", which are diaphragm values (F-number) of the main series, are arranged in this order as the diaphragm value scales 53. The indicator 54 is a linear mark, and is provided at a position that is to be in contact with the distal end portion of the diaphragm operation ring 24.

The value of any one of the diaphragm value scales 53 is matched with the indicator 54, so that the diaphragm operation ring 24 can selectively set the diaphragm value of the main series. In addition, a predetermined position (a position corresponding to any one of trisected intervals of an interval) between two adjacent values of the diaphragm value scales 53 is matched with the indicator 54, so that the diaphragm operation ring 24 can selectively set the diaphragm value of the subordinate series.

Further, a mark 55 of "A" is provided on the diaphragm operation ring 24 outside the diaphragm value scales 53, that is, outside the value of "16" in this embodiment in the circumferential direction. The mark 55 represents the above-mentioned AE position. The mark 55 is matched with the indicator 54, so that the diaphragm operation ring 24 can set an exposure mode to the automatic exposure mode from a manual exposure mode.

The code board 34, which forms a part of the sensor 26, is provided on the inner peripheral side of the diaphragm operation ring 24. The first and second contact brushes 35 and 36 are provided on the outer peripheral side of the lens barrel body 21 through a mounting plate 56. The mounting plate 56 is an annular thin plate, and is fixed to the rear end portion of the lens barrel body 21.

Figure 7:
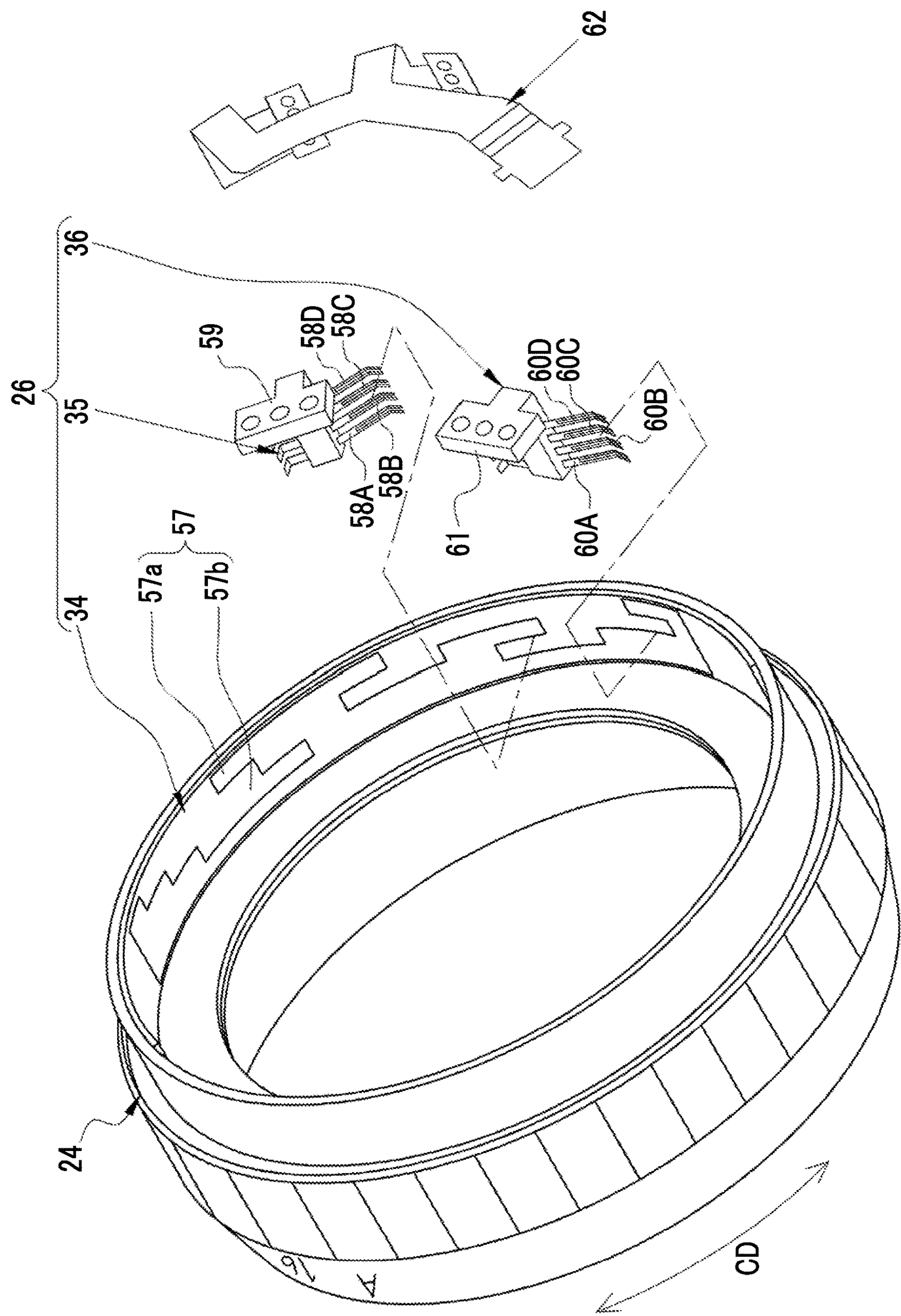
FIG. 7 is a perspective view of a code board and the first and second contact brushes.

As shown in FIG. 7, the code board 34 is a thin plate (for example, a flexible substrate) and is curved along the inner peripheral surface of the diaphragm operation ring 24. The code board 34 includes a conductive portion *57a* and a non-conductive portion *57b*, and the pattern 57 is formed by a combination of the conductive portion *57a* and the non-conductive portion *57b*. The conductive portion *57a* is electrically isolated. The code board 34 is mounted on the diaphragm operation ring 24 in a state in which portions other than conductive contacts 58A to 58D and 60A to 60D to be described later are not in contact with the conductive portion *57a* and the non-conductive portion *57b*.

The first contact brush 35 is a brush member that includes four conductive contacts 58A to 58D and a holding member 59 holding the conductive contacts 58A to 58D. The holding member 59 is formed in an L shape, and holds the proximal end portions of the conductive contacts 58A to 58D. The holding member 59 is fixed (for example, screwed) to the mounting plate 56 and the mounting plate 56 is fixed to the lens barrel body 21, so that the first contact brush 35 is mounted on the outer peripheral surface of the lens barrel body 21.

The conductive contacts 58A to 58D slide on the code board 34 in accordance with the rotation of the diaphragm operation ring 24. Among the conductive contacts 58A to 58D, one conductive contact 58A is a reference contact that is always in contact with the conductive portion *57a*. The other conductive contacts 58B to 58D except for the conductive contact 58A are signal contacts that are in contact with either the conductive portion *57a* or the non-conductive portion *57b*.

The second contact brush 36 is provided at a position different from the position of the first contact brush 35 in a circumferential direction CD of the diaphragm operation ring 24. As in the case of the first contact brush 35, the second contact brush 36 is a brush member that includes four conductive contacts 60A to 60D and a holding member 61 holding the conductive contacts 60A to 60D. The holding member 61 is formed in an L shape, and holds the proximal end portions of the conductive contacts 60A to 60D. The holding member 61 is fixed to the mounting plate 56, so that the second contact brush 36 is mounted on the lens barrel body 21 as in the case of the first contact brush 35.

The conductive contacts 60A to 60D slide on the code board 34 in accordance with the rotation of the diaphragm operation ring 24. The conductive contacts 60A to 60D have the same structure as the conductive contacts 58A to 58D. Among the conductive contacts 60A to 60D, one conductive contact 60A is a reference contact that is always in contact with the conductive portion *57a*. The other conductive contacts 60B to 60D except for the conductive contact 60A are signal contacts that are in contact with either the conductive portion *57a* or the non-conductive portion *57b*.

The conductive contacts 58A to 58D and 60A to 60D are connected to the lens control unit 29 through a connection board 62. Further, the distal end portion, which is in contact with the code board 34, of each of the conductive contacts 58A to 58D and 60A to 60D is branched into two parts for the improvement of contact between each conductive contact and the code board 34. The invention is not limited thereto, and the distal end portion of each of the conductive contacts 58A to 58D and 60A to 60D may be branched into three or more parts.

A first potential (for example, a ground potential) serving as a reference is applied to each of the conductive contacts 58A and 60A that are the reference contacts. In a case in which the conductive contacts 58B to 58D and 60B to 60D, which are the signal contacts, are in contact with the conductive portion 57*a*, the conductive contacts 58B to 58D and 60B to 60D are electrically connected to the conductive contacts 58A and 60A, which are the reference contacts, through the conductive portion 57*a*. Accordingly, the conductive contacts 58B to 58D and 60B to 60D output the first potentials to the lens control unit 29 as signals. Further, since the conductive contacts 58B to 58D and 60B to 60D, which are signal contacts, are connected to a power supply through a pull-up resistor, the conductive contacts 58B to 58D and 60B to 60D output second potentials (for example, positive potentials), which are different from the first potential, to the lens control unit 29 as signals in a case in which the conductive contacts 58B to 58D and 60B to 60D are in contact with the non-conductive portion 57*b* (high-impedance state).

As described above, the first potential or the second potential is output from each of the conductive contacts 58B to 58D and 60B to 60D, which are the signal contacts, in accordance with a state in which the conductive contacts 58B to 58D and 60B to 60D are in contact with the code board 34. Accordingly, the lens control unit 29 can detect information on the number of patterns in which the first potentials and the second potentials output from the respective conductive contacts 58B to 58D and 60B to 60D are combined. That is, the lens control unit 29 detects the position of the diaphragm operation ring 24 on the basis of signals of 2N bits that are acquired from the conductive contacts 58B to 58D and 60B to 60D of the first and second contact brushes 35 and 36. N denotes the number of the signal contacts of each of the first and second contact brushes 35 and 36. Since the number of the signal contacts of each of the first and second contact brushes 35 and 36 is 3 in this embodiment, "2N=6" is satisfied.

Figure 8:
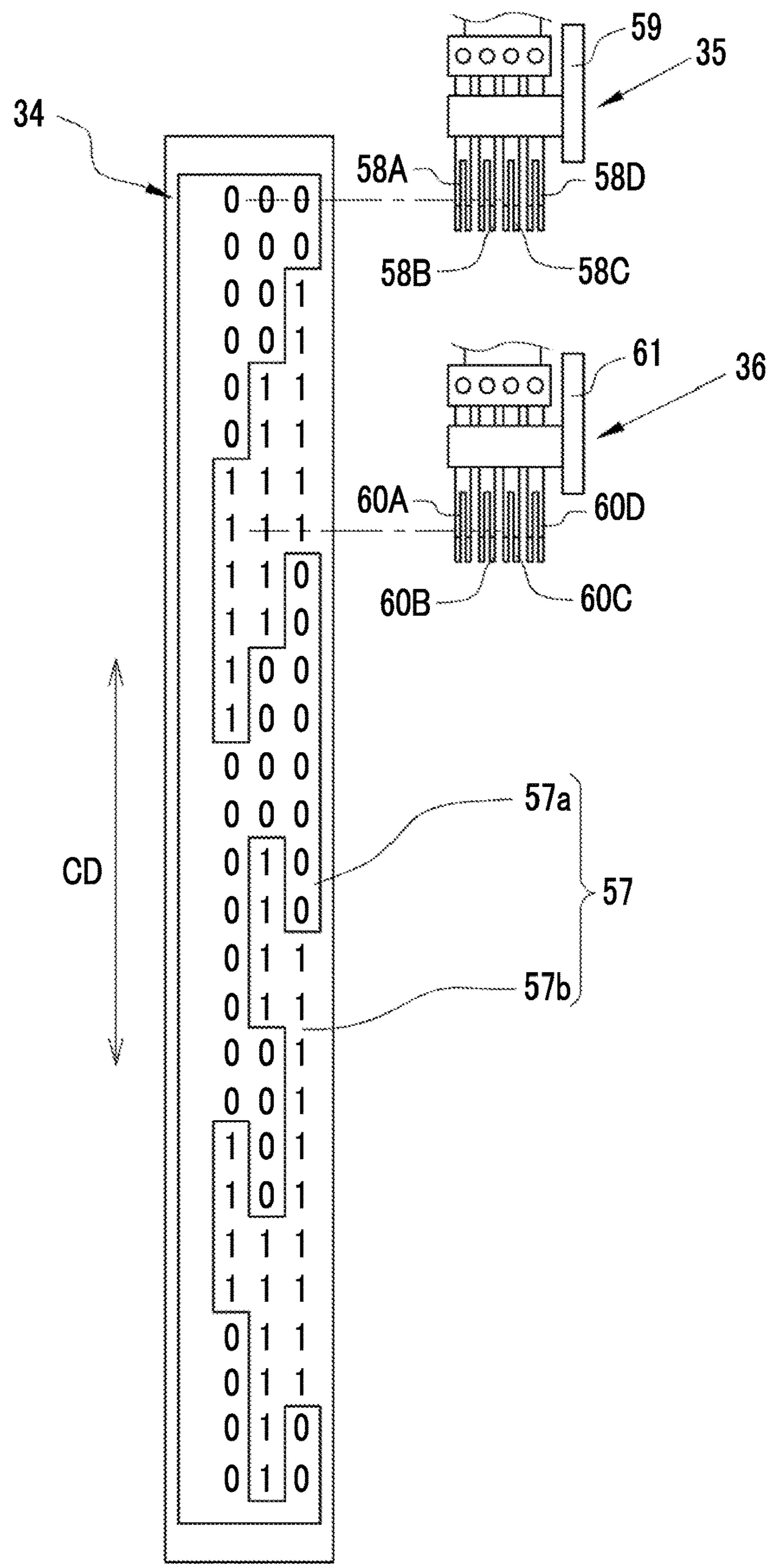
FIG. 8 is a diagram illustrating a signal that is generated by a pattern formed on the code board.

As shown in FIG. 8, the pattern 57 of the code board 34 is formed so that signals obtained from the conductive contacts 58B to 58D and 60B to 60D are different from each other in the circumferential direction CD. In this embodiment, the signal of the first potential is written as "0" and the signal of the second potential is written as "1". In the following description, a width where the signals obtained from the conductive contacts 58B to 58D and 60B to 60D are changed in the pattern 57 in the circumferential direction CD is referred to as "one stage".

The second contact brush 36 is disposed so as to be away from the first contact brush 35 in the circumferential direction CD by seven stages. The pattern 57 has a shape where signals of six bits are changed at an interval of one bit in a case in which the diaphragm operation ring 24 is rotated and the conductive contacts 58B to 58D and 60B to 60D slide on the pattern 57. That is, the pattern 57 generates a change in the potential of the signal contact, which is accompanied with the rotation of the diaphragm operation ring 24, on only one of the signal contacts at a time.

Specifically, the pattern 57 generates the same signal on each of the first and second contact brushes 35 and 36 at an interval of two stages in the circumferential direction CD with the rotation of the diaphragm operation ring 24, but a timing at which a signal is changed on the first contact brush 35 and a timing at which a signal is changed on the second contact brush 36 are different from each other by one stage. Accordingly, only a signal of one bit is changed by one stage.

If signals of two or more bits are simultaneously changed with the rotation of the diaphragm operation ring 24, there is a possibility that the lens control unit 29 may misrecognize a signal pattern in a case in which a time difference exists in a change in the each of signals of two or more bits. The pattern 57 of this embodiment prevents the misrecognition of the signal pattern.

FIG. 9 shows a correspondence relationship between a diaphragm value (AV value) and signal values that are acquired from the conductive contacts 58B to 58D and 60B to 60D. In this embodiment, it is possible to set an exposure mode to an automatic exposure mode in addition to nineteen diaphragm values by the rotational position of the diaphragm operation ring 24. For this reason, the pattern 57 includes a total of 22 stages, that is, nineteen stages for setting diaphragm values and three stages corresponding to the AE positions.

In this embodiment, positions corresponding to three stages, which include an original AE position and front and rear positions of the original AE position, are used as the AE positions. The reason for this is to prevent the careless switching of an exposure mode between the manual exposure mode and the automatic exposure mode. Accordingly, the number of stages corresponding to the AE positions is not limited to three and may be other numerical values.

The actuation of the camera 10 will be described below. First, in a case in which the power lever 13 is operated by a user and a power supply is turned on, a power supply voltage is supplied to the respective parts of the camera 10. In a case in which the operation buttons (not shown) and the like are operated and an imaging mode is selected, the lens control unit 29 detects the rotational position of the diaphragm operation ring 24 from the detection signal of the sensor 26 and outputs the rotational position to the body control unit 37. In a case in which the mark 55 is positioned at the position of the indicator 54, a signal representing the AE position is obtained as the detection signal. The body control unit 37 instructs the AE processing unit 48 and the like to start the automatic exposure mode in a case in which the body control unit 37 determines that the detection signal represents the AE position.

In a case in which the automatic exposure mode is started and an S1-ON signal is input to the body control unit 37 by the half-press operation of the release switch 14, the body control unit 37 determines a shutter speed and a diaphragm value on the basis of an integrated value calculated by the AE processing unit 48, controls the driving of the shutter motor 47, and controls the diaphragm diameter of the diaphragm unit 33 through the lens control unit 29 so that the determined diaphragm value is obtained.

In a case in which the diaphragm value scales 53 is positioned at the position of the indicator 54, a signal representing a diaphragm value (main series or subordinate series) is obtained as a detection signal. The lens control unit 29 controls the diaphragm diameter of the diaphragm unit 33 so that the diaphragm value represented by the detection signal is obtained.

Since the code board 34 is provided on the inner peripheral side of the diaphragm operation ring 24 and the first and second contact brushes 35 and 36 are provided on the outer peripheral side of the lens barrel body 21 as described above, a space, in which the first and second contact brushes 35 and 36 are moved with the rotation of the diaphragm operation ring 24, does not need to be provided inside the lens barrel 12 and the code board 34 is formed to have a small thickness. For this reason, the size of the lens barrel 12 in the radial direction can be reduced.

Since the first and second contact brushes 35 and 36, which are provided at positions different from each other in the circumferential direction of the diaphragm operation ring 24, are provided as the brush members, the number of conductive contacts arranged in the axial direction of the lens barrel 12 can be reduced. For this reason, the size of the lens barrel 12 in the axial direction can be reduced.

In the embodiment, the pattern 57 formed on the code board 34 has the number of stages corresponding to the AE positions in addition to the number of stages corresponding to the number of settable diaphragm values. However, the pattern 57 is not limited thereto, and has only to have the number of stages corresponding to the number of at least the diaphragm values.

In the embodiment, the code board 34, the first and second contact brushes 35 and 36, and the lens control unit 29 functioning as a rotational position-detection unit have been provided as a structure that detects the rotational position of the diaphragm operation ring for allowing a diaphragm value to be selectively set from a plurality of values. However, the invention is not limited thereto, may be applied to a structure that detects the rotation of an operation ring rotatably mounted on the lens barrel body, and may also be applied to, for example, a structure that detects the rotational position of the focus ring.

In the embodiment, the brush members have been formed of two contact brushes (first and second contact brushes 35 and 36) that are provided at positions different from each other in the circumferential direction. However, the number of the contact brushes is not limited to "2". For example, one contact brush may be provided. In this case, the brush member includes one reference contact and a plurality of signal contacts, and the number of the signal contacts is equal to the number of bits that are required to detect the rotational position of the operation ring. For example, in a case in which signals of six bits are to be acquired as in the embodiment, the number of the signal contacts is "6".

In the embodiment, the second contact brush 36 has been disposed so as to be away from the first contact brush 35 in the circumferential direction CD by seven stages. However, the number of stages, by which the second contact brush 36 is disposed so as to be away from the first contact brush 35, may be a predetermined odd number value. The reason to set the number of stages to an odd number value is to make a timing at which a signal is changed on the first contact brush 35 and a timing at which a signal is changed on the second contact brush 36 be different from each other by one stage. More specifically, in a case in which the number of bits required to detect the rotational position of the operation ring is set to 2N bits (N is the number of the signal contacts of the first and second contact brushes 35 and 36), it is preferable that the number of stages by which the second contact brush 36 is disposed so as to be away from the first contact brush 35 is 2N+1. For example, the second contact brush 36 is disposed so as to be away from the first contact brush 35 by five stages in a case in which a signal of four bits is to be acquired, and the second contact brush 36 is disposed so as to be away from the first contact brush 35 by nine stages in a case in which a signal of eight bits is to be acquired.

In the embodiment, a mirrorless single-lens digital camera has been described by way of example. However, the invention can also be applied to other lens-interchangeable digital cameras, such as a single-lens reflex digital camera.

Further, in the digital camera of the embodiment, the camera body and the lens barrel have been separately formed and detachably connected to each other. However, the invention is not limited thereto, and may provide an imaging device of which a camera body and a lens barrel are integrated with each other.

EXPLANATION OF REFERENCES

10: lens-interchangeable digital camera
11: camera body
12: lens barrel
21: lens barrel body
22: imaging optical system
24: diaphragm operation ring
25, 26: sensor
34: code board
35: first contact brush
36: second contact brush
57: pattern
57*a*: conductive portion
57*b*: non-conductive portion
58A to 58D, 60A to 60D: conductive contact

What is claimed is:

1. A lens barrel comprising:

a lens barrel body;

an operation ring that is rotatably mounted on the lens barrel body;

a code board which is provided on an inner peripheral side of the operation ring and on which a pattern is formed by a combination of an electrically isolated conductive portion and a non-conductive portion;

brush members that are provided on an outer peripheral side of the lens barrel body and include a plurality of conductive contacts sliding on the code board in accordance with a rotation of the operation ring; and a rotational position-detection unit that acquires signals from the conductive contacts and detects a rotational position of the operation ring, wherein the plurality of conductive contacts are formed of a reference contact to which a first potential is applied and which is always in contact with the conductive portion, and a plurality of signal contacts that are in contact with either the conductive portion or the non-conductive portion, output the first potential as the signals by being electrically connected to the reference contact through the conductive portion in a case in which the signal contacts are in contact with the conductive portion, and output a second potential different from the first potential as the signals in a case in which the signal contacts are in contact with the non-conductive portion, wherein the brush members are formed of first and second contact brushes that are provided at positions different from each other in a circumferential direction of the operation ring, wherein the pattern has a plurality of stages corresponding to the rotational position, and wherein the pattern has a shape where only a signal of one bit, with respect to the signals acquired from the conductive contacts, is changed by one stage of the plurality of stages, by differentiating a timing at which a signal is changed on the first contact brush and a timing at which a signal is changed on the second contact brush by the one stage, when the first and second contact brushes slide in accordance with the rotation of the operation ring.

2. The lens barrel according to claim 1, wherein the pattern has a shape where a change in a potential of the signal contact, which is accompanied with a rotation of the operation ring, is generated on only one of the signal contacts at a time.

3. The lens barrel according to claim 1, wherein the second contact brush is disposed at a position that is away from the first contact brush by predetermined odd-numbered stages of the pattern.

4. The lens barrel according to claim 1, wherein the first potential is a ground potential, and the second potential is a positive potential.

5. The lens barrel according to claim 1, wherein the lens barrel body includes a diaphragm and a diaphragm control unit that controls a diaphragm value of the diaphragm, and the operation ring is a diaphragm operation ring that allows the diaphragm value to be selectively settable from a plurality of values.

6. The lens barrel according to claim 5, wherein the pattern includes at least the number of stages corresponding to a settable numerical value of the diaphragm value.

7. The lens barrel according to claim 1, wherein a distal end portion, which is in contact with the code board, of each conductive contact is branched into two or more parts.

8. An imaging device comprising:

the lens barrel according to claim 1.

* * * * *